(12) United States Patent
Raman

(10) Patent No.: US 7,096,272 B1
(45) Date of Patent: Aug. 22, 2006

(54) METHODS AND APPARATUS FOR POOLING AND DEPOOLING THE TRANSMISSION OF STREAM DATA

(75) Inventor: Suchitra Raman, Winchester, MA (US)

(73) Assignee: Cisco Technology, Inc., San Jose, CA (US)

(*) Notice: Subject to any disclaimer, the term of this patent is extended or adjusted under 35 U.S.C. 154(b) by 664 days.

(21) Appl. No.: 10/044,212

(22) Filed: Nov. 20, 2001

(51) Int. Cl.
    *G06F 15/16* (2006.01)
(52) U.S. Cl. ................................ 709/231; 709/238
(58) Field of Classification Search ............... 709/219, 709/229, 231, 238
    See application file for complete search history.

(56) References Cited

U.S. PATENT DOCUMENTS

| | | | | |
|---|---|---|---|---|
| 5,598,535 | A | * | 1/1997 | Brech et al. ............... 709/230 |
| 5,754,768 | A | * | 5/1998 | Brech et al. ............... 709/230 |
| 5,859,853 | A | * | 1/1999 | Carlson ...................... 370/468 |
| 6,298,070 | B1 | * | 10/2001 | Carlson et al. ............. 370/465 |
| 2002/0042837 | A1 | * | 4/2002 | Ebata et al. ................ 709/232 |
| 2003/0039248 | A1 | * | 2/2003 | Weaver ....................... 370/392 |
| 2003/0046429 | A1 | * | 3/2003 | Sonksen ...................... 709/246 |

OTHER PUBLICATIONS

Network Working Group; H. Schulzrinne; Real Time Streaming Protocol (RTSP); http://www.ietf.org/rfc/rfc2326.txt; Oct. 15, 2001; 73 pages.

* cited by examiner

*Primary Examiner*—Rupal Dharia
*Assistant Examiner*—Brian J. Gillis
(74) *Attorney, Agent, or Firm*—Chapin IP Law, LLC; Barry W. Chapin, Esq.

(57) ABSTRACT

Mechanisms and techniques provide a system that can transmit stream data in a computer network. The system can identify at least two packets of stream data that are destined to a common location in a computer network and can form a pooled packet of stream data using the packets of stream data. The system can then transmit the pooled packet to the common location in the computer network. In another configuration, the system can receive a pooled packet of stream data containing a representation of at least two packets of stream data and detect if the pooled packet of stream data contains at least one packet of stream data. If the packet of stream data is to be extracted from the pooled packet, the system can extract the packet of stream data and can transmit the extracted packet of stream data to a destination associated with the packet.

36 Claims, 6 Drawing Sheets

| 190-A EXAMPLE POOLED PACKET INDEX ||| 
|---|---|---|
| 191 PACKET | 192 START | 193 LENGTH |
| 170-1 | 0 | 300 BYTES |
| 170-2 | 300 | 300 BYTES |
| 170-3 | 600 | 300 BYTES |

FIG. 5A

| 190-B EXAMPLE POOLED PACKET INDEX ||||
|---|---|---|---|
| 191 PACKET | 192 START | 193 LENGTH | 194 TIME TO LIVE |
| 170-4 | 0 | 256 | 5 HOPS |
| 170-5 | 256 | 300 | 5HOPS |
| 170-6 | 556 | 102 | 3HOPS |
| 170-7 | 658 | 512 | 4HOPS |

METHODS AND APPARATUS FOR POOLING AND DEPOOLING THE TRANSMISSION OF STREAM DATA

BACKGROUND OF THE INVENTION

Computer and information networks such as the Internet allow computer systems to exchange streams of data such as audio data, video data, multimedia data or other stream data or content between software applications that operate on such computer systems. As an example, a user controlling a web browser operating on a client computer system can select a hyperlink that corresponds to audio stream data that an audio stream server computer system can serve to the client computer system over the Internet. In response to such a user selection, the web browser can invoke an audio player software application that operates in conjunction with the web browser on the client computer system. The audio player software application can communicate with the audio stream server software application operating on the audio stream computer system over the computer network using in order to establish an audio stream data connection between the client computer system and the audio server. Once such a connection is established, the audio stream server can begin serving or streaming the audio stream data in a series of data packets using a stream transfer protocol back to the audio player software application operating on the client computer system. The audio player software application can then play the audio data through speakers coupled to the client computer system for the enjoyment of the user.

There exist a variety of conventional stream transfer protocols that provide for and support the transfer of stream data between computer systems, such as the client and server computers mentioned above, over a computer network such as the Internet. Some stream transfer protocols are real-time protocols while others can distribute stream data or other content or media in a non-real-time manner.

One example of a real-time or near real-time data transfer or streaming communications protocol is the multicast protocol. The multicast protocol or "multicasting" as it is called allows a server computer system to serve stream data as a single series or stream of packets that are each addressed to a predetermined multicast destination network address called a multicast group address that identifies the stream of data contained within the series of packets. As an example, a radio station might operate an multicasting audio server using the multicast protocol to serve a stream of packets containing the audio data broadcast from the radio station onto the Internet. Each multicast packet of audio data contains the same multicast destination network address (e.g., the multicast IP address). Multicast-equipped data communications devices such as routers and switches within the Internet can route the packets addressed to the multicast destination network address towards client computer systems that request to subscribe or "join" to the multicast group identified by the multicast address.

Many streaming data transfer and communications protocols such as multicast only require that a single copy of each packet of the stream data (such as the audio data in the aforementioned example) be transferred once over any particular data link (i.e., a coupling between two data communications devices) in a computer network regardless of how many subscribers or listeners (i.e., clients) are receiving that stream of data. This avoids having to transfer a separate packet of stream data over the same data link to each client that the desires to receive the stream data. Through the use of multicast management protocols, multicast-equipped data communications devices within a computer network are able to determine onto which data links a received multicast packet must be forwarded in order to ensure that all clients currently subscribed to the multicast group associated with that packet can successfully receive the stream data.

As an example, a single stream of multicast packets containing streaming audio data may propagate through a computer network for a number of network "hops" (i.e., individual data links coupling data communications devices) before being split or branched within a data communications device that serves different portions of the computer network that each contain clients desiring to receive that stream data. When the single stream of multicast packets arrive at this data communications device, this data communications device is capable of replicating or splitting the single received multicast packet stream into duplicate multicast packet streams which the data communications device then forwards onto the respective different portions of computer network (i.e., onto two or more data links or hops) towards their destination client devices.

For further details on the operation of the multicast protocol, reference is made to Request For Comment 1075 (RFC-1075) entitled "Distance Vector Multicast Routing Protocol (DVMRP)" which is a document maintained by the Internet Engineering Task Force (IETF) that specifies an Internet standards track routing protocol for Multicast. The entire teaching and contents of the RFC-1075 document are hereby incorporated by reference herein in their entirety. Other streaming media protocols also exist and operate to coordinate the distribution and transfer of stream data through a computer network such as the Internet. Each of these conventional stream distribution protocols attempts to implement an efficient one-to-many communications technique. Examples of other such protocols are the Real Time Protocol (RTP), RealNetworks RDT protocol and Microsoft's MMSU/MMST protocols.

Another type of Multicasting is referred to as Application Level Multicasting or ALM. ALM provides for a data stream distribution strategy that "overlays" a virtual distribution or routing hierarchy over an Internet Protocol (IP) routing topology. Using ALM, servers or hosts (referred to herein as ALM nodes), as opposed to routers and switches within the network, are responsible for replicating packets or data to end points. Accordingly, in ALM, routers in the underlying IP network merely treat ALM packets as regular unicast packets of data.

SUMMARY OF THE INVENTION

Conventional techniques for coordinating and controlling the transmission of stream data through a computer network suffer from certain deficiencies. In particular, distribution of real-time content such as audio or video data using one of the aforementioned stream distribution protocols frequently entails the encapsulation of relatively small portions of stream data within a packet which is then transferred and distributed onto the computer network. By relatively small, what is meant is that the stream data portions of the packet may be, for example, only a few hundred bytes in size within each packet and do not typically occupy the entire allowable payload amount allowed in the packet. As such, the stream distribution protocols transfer the stream data as a "thin" stream using many packets at a known average encoded bit rate, instead of utilizing the full data transfer or payload capacity of each packet. The exact relationship between encoding bit rate and average packet size depends upon the specific encoding algorithm or technique in use by that protocol. In general, conventional stream distribution protocols transfer many small packets or datagrams in the 100 to 300 byte range for payload sizes as opposed to transferring larger packets having maximized payload capacities of 1200 bytes or more.

Since conventional stream distribution protocols transport the stream data using a large number of small packets of stream data, the data communications devices within the computer network that propagate the stream data must individually process each of these small packets of stream data. This requires a significant amount of interrupt handling and packet header processing. For data communications devices such as network routers and switches that process each packet at the network layer or below (i.e., Layer 2 or 3 devices), interrupt handling and header processing is required to route and forward each packet within the network and this processing can consume valuable router or switch processing resources.

Embodiments of the present invention significantly overcome the aforementioned deficiencies present in conventional systems for controlling and providing transmission propagation of stream data within a computer or communications network. In particular, embodiments of the invention provide techniques and mechanisms for pooling packets of stream data together for transfer within a single pooled packet of stream data within a network. In one embodiment of the invention, a data communications device such as a router or switch or an ALM node can identify two or more packets of stream data that are destined to a common location within a computer network. The common location may be a recipient client device, multiple recipient client devices served by a single data communications device or any individual data communications device such as a switch or router that exists anywhere along a shared network path that the two or more packets would follow if they were to be normally transferred (i.e., routed) separately through the computer network on an individual basis to their final destinations. In one embodiment, such packets are pooled if they arrive at the data communications device using the invention within a predetermined time frame from one another called a pooling time window. The pooling time window represents a period of time during which two packets must arrive at a data communications device in order to be pooled into a single pooled packet and forwarded to the common location. The pooling time window is typically set to be a small enough length of time during which a first arriving packet can be delayed for a short period of time while awaiting arrival or detection of another packet to be pooled without introducing a significant delay into the stream of data associated with either the first or second packets, or both if they are associated with the same stream of data.

The data communications device thus forms a pooled packet of stream data using the two or more packets of stream data that are destined to the common location within the computer network. The data communications device then transmits the pooled packet onto the network towards the common location. Data communications devices along the path or route that the pooled packet travels through the computer network only incur the interrupt and packet header overhead processing required to handle the single pooled packet, as opposed to handling each individual stream data packet had those individual packets been transferred separately through the computer network. In this manner, the system of the invention is capable of aggregating, packaging, pooling or otherwise encapsulating multiple individual stream data packets into a single pooled packet for transfer to a computer network when each of the stream data packets within the single pooled packet shares at least a portion of the network path of the pooled packet. As will be explained, other pooling criteria can be used as well to determine when an individual stream data packet can be included into a pooled packet. Examples of such other pooling criteria are if the individual packet shares a certain number of network hops with other packets in the pooled packet, or if the individual packet of stream data meets a minimum size requirement or threshold (e.g., is smaller than a certain size).

More specifically, embodiments of the invention provide methods for transmitting stream data in a computer network. One such method comprises the steps of identifying at least two packets of stream data that are destined to a common location in a computer network and forming a pooled packet of stream data using the two (or more) packets of stream data. The packets may or may not be related to the same stream of data. The method then transmits the pooled packet to the common location in the computer network. In this manner, by pooling packets of stream data, interrupt processing and packet header processing overhead is conserved within data communications devices that propagate the pooled packet as opposed to having to process each individual packet of stream data.

In another embodiment, the step of identifying comprises the steps of detecting a first packet of stream data and obtaining routing information based on information in the first packet that identifies a first network path upon which the first packet of stream data is to be routed. The method then detects at least one second packet of stream data containing information that indicates the second packet is also to be routed on the first network path. In this manner, packets that share a network path can be pooled together.

In a further embodiment, the first network path identifies a first predetermined number of network hops upon which the first packet is to be routed and the step of detecting at least one second packet comprises the steps of detecting at least one second packet that is to be routed on the first network path for a second predetermined number of network hops that exist along the first network path. The packets may share the same number of hops, or some packets in a pooled packet might share the same number of network hops while other packets share a different number of hops. In one embodiment, the first predetermined number of network hops is greater than or equal to the second predetermined number of network hops.

In still another embodiment, the steps of detecting a first packet and detecting a second packet occur in relation to each other within a pooling time window such that the step of forming a pooled packet forms a pooled packet from only those packets that arrive within the pooling time window and that are destined towards a common location in the computer network.

In another embodiment, the step of identifying further comprises the step of identifying a predetermined number of packets to be included in the two or more packets, such that step of forming forms a pooled packet that contains the predetermined number of packets destined to a common location in a computer network. In another embodiment, the step of identifying comprises the step of identifying packets to be included in two packets (i.e., for the pooled packet) that have sizes that meet a predetermined size requirement, such that a sum of sizes of the at least two packets that form the pooled packet does not exceed a maximum packet size. In this manner, a pooled packet can be limited to include only a certain number of packets, or may be required to include a certain number before being transferred, such as may be useful in non-real time scenarios.

In an additional embodiment, the step of forming a pooled packet comprises the steps of combining contents of each of the two or more packets into the pooled packet and generating a pooled packet index for the pooled packet. The pooled packet index indicates a location within the pooled packet of each of the two or more packets. Also, the step of transmitting the pooled packet to the common location in the computer network includes transmitting the pooled packet index to the common location in the computer network. The pooled packet index may be transmitted within the pooled packet itself, or may be sent out-of-band from the pooled packet. In another configuration, the pooled packet index may be predetermined such that pooled packets themselves do not need pooled packet indexes. In such cases, data communications devices that create pooled packets and data communications devices that depool or extract packets of stream data from pooled packets may be preconfigured with knowledge of the structure of pooled packets, as may be the case when every packet of stream data is the same size.

In another embodiment, the location of each of the two or more packets in the pooled packet indicates a starting position of each of the packets in the pooled packet and the pooled packet index indicates a length of each of the packets in the pooled packet. This information allows a data communications device that extracts packets from the pooled packet based on their positioning within the pooled packet in relation to the start of the pooled packet or in relation to other pooled packets.

In a further embodiment, the pooled packet index includes at least one time to live indicator indicating a number of network hops along a route towards the common location in the computer network that at least one packet in the pooled packet is to be transmitted. Each packet within the pooled packet that is identified in the pooled packet index may have an associated time to live field which thus indicates when that packet is to be extracted from the pooled packet. In this manner, a pooled packet can carry packets of stream data that are extracted at different hops along the path of the pooled packet as it travels through the network.

In another embodiment, the packets in the pooled packet are encoded to be transported through the computer network using a stream transfer protocol, examples of which are provided herein.

Other embodiments of the invention provide methods for transmitting stream data in a network and include the steps of receiving, at a first destination in the computer network, a pooled packet of stream data containing a representation of at least two packets of stream data. The method detects if the pooled packet of stream data contains at least one packet of stream data that is to be extracted from the pooled packet of stream data at the first destination. If the packet of stream data (one or more) is to be extracted from the pooled packet, the method comprises the steps of extracting the packet(s) of stream data from the pooled packet and transmitting the extracted packet(s) of stream data to a destination associated with the at least one packet. This allows a data communications device equipped to perform this method the ability to extract packets form pooled packets.

In another embodiment, the step of receiving comprises the step of decrementing a time to live indicator within the pooled packet. Furthermore, the step of detecting detects that the pooled packet of stream data contains at least one packet of stream data that is to be extracted from the pooled packet if the time to live indicator within the pooled packet has expired. Thus any packets having a time to live indicator of zero, for example, are extracted from the pooled packet, while other packets of stream data within the pooled packer may remain in the pooled packet until their respective time to live indicators also expire. The time to live indicators are decremented at each network hop.

In another embodiment, the step of detecting detects that the pooled packet of stream data contains at least one packet of stream data that is to be extracted from the pooled packet if a destination indicator in the pooled packet is equal to a destination location of the first destination in the computer network. In other words, packets are extracted from the pooled packet if the pooled packet has reached its final destination.

In still another embodiment, the step extracting the packet(s) of stream data from the pooled packet comprises the steps of obtaining, from a pooled packet index in the pooled packet, a starting location and length of the packet(s) of stream data in the pooled packet and extracting the packet(s) of stream data from the pooled packet based on the starting location and length of those packet(s) of stream data.

Other embodiments of the invention include a computerized device or system, such as a data communications device (e.g., switch, router, hub, bridge, gateway, ALM node, host, computer system, or the like), computerized device, add-on card or other component configured with software and/or circuitry to process and perform all of the method operations noted above and disclosed herein as embodiments of the invention. In such embodiments, the device, such as a data communications device comprises a communications interface (e.g., a network interface), a memory (e.g., any type of computer readable medium, storage or memory system), a processor and an interconnection mechanism connecting the communications interface, the processor and the memory. In such embodiments, the memory system is encoded with a packet pool controller application that when performed on the processor, produces a packet pool controller process that causes the computer system to perform any and/or all of the method embodiments, steps and operations explained herein as embodiments of the invention. In other words, a computer, switch, router or other device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured to operate with features as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other device to cause such a device to perform the techniques explained herein as embodiments of the invention.

Embodiments of the invention also include computer program products such as disks, memory, or other computer readable media that have a computer-readable medium including computer program logic encoded thereon for controlling transmission of stream data between the computer systems in a network computer environment, such that the computer program logic, when executed on at least one processing unit with the computerized device, causes the at least one processing unit to perform any or all of the aforementioned methods.

The embodiments of the invention may be implemented by computer software and/or hardware mechanisms within a data communications device or another computerized apparatus. It is to be understood that the system of the invention can be embodied strictly as a software program, as software and hardware, or as hardware or firmware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the invention provide a packet pool controller that operates within a data communications device such as a network switch or router or in a computer system such as an Application Level Multicasting node (server or host) coupled to a computer network. The packet pool controller is capable of identifying at least two packets of stream data that are destined to be routed or otherwise transferred towards a common location within a computer network. Based on this identification, the packet pool controller can form a pooled packet of stream data using the two or more packets of stream data, thus aggregating two or more individual packets of stream data into a single pooled packet. The pooled packet of stream data can contain a pooled packet index that identifies, for example, a starting location and length of each individual stream data packet contained within the pooled packet of stream data. Upon completion of forming the pooled packet of stream data, the packet pool controller can transmit the pooled packet onto the computer network towards the common location. By combining or aggregating the individual packets of stream data into the single pooled packet of stream data, embodiments of the invention reduce the amount of interrupt handling overhead and header processing that is required by data communications devices along the path to the common location upon which the pooled packet travels through the computer network.

As the pooled packet travels through data communications devices within the computer network, such devices may or may not be equipped with embodiments of the invention. Those that are not equipped with an embodiment of the invention can simply route the pooled packet towards the common location (which is the destination address of the pooled packet), just as any other packets of data are routed within the computer network. However, within data communications devices that are equipped with certain embodiments of the invention, such devices are able to receive the pooled packet of stream data and can detect if the pooled packet of stream data contains one or more encapsulated packets of stream data that are to be extracted from the pooled packet within this data communications device. The identification of a pooled packet and the determination if that pooled packet contains stream data packets that are to be extracted from the pooled packet can be done in a variety of ways, as will be explained in detail shortly.

As a brief example, suppose upon creation of the pooled packet, the packet pool controller identifies three packets of stream data that, if routed individually, would travel by different amounts or hops along the same network path. The three packets of stream data might be associated with different independent data streams which may or may not be destined for the same recipient client device but which, for at least a portion of their routing path through the computer network, share a common network route. As such, the packet pool controller may aggregate these packets of stream data into the same pooled packet and may assign a time to live value within the packet pool index for each of the combined packets of stream data. In essence, the time to live values indicate a number of network hops that can take before extraction of a stream data packet is to take place from the pooled packet.

As a specific example, one packet may require routing along three shared network hops along with the other two packets. The other two packets however may be require routing for an additional two shared network hops beyond the network path of the first packet. Since the three packets share at least the first three network hops together, the packet pool controller may form a pooled packet from the three packets of stream data. The pooled packet index can indicate a time to live value of three for the first packet of stream data, while the other two packets of stream data may have associated time to live values of five. As the pooled packet enters into a data communications device equipped with the invention at the third network hop, this device can decrement the time to live field associated with each packet in the pooled packet and can inspect the pooled packet index to detect that the first packet of stream data is now to be extracted from the pooled packet since its time to live indicator is now zero. The packet pool controller can extract the first packet of stream data from the pooled packet while the other two packets remain within the pooled packet. The data communications device can then forward the first packet of stream data towards its destination on a different route than the pooled packet while the pooled packet can be forwarded towards the remaining two hops of the common location shared by the remaining two packets of stream data that still remain within the pooled packet.

Other embodiments of the invention that are explained herein disclose various alternative configurations for operation of the packet pool controller as well.

Figure 1:
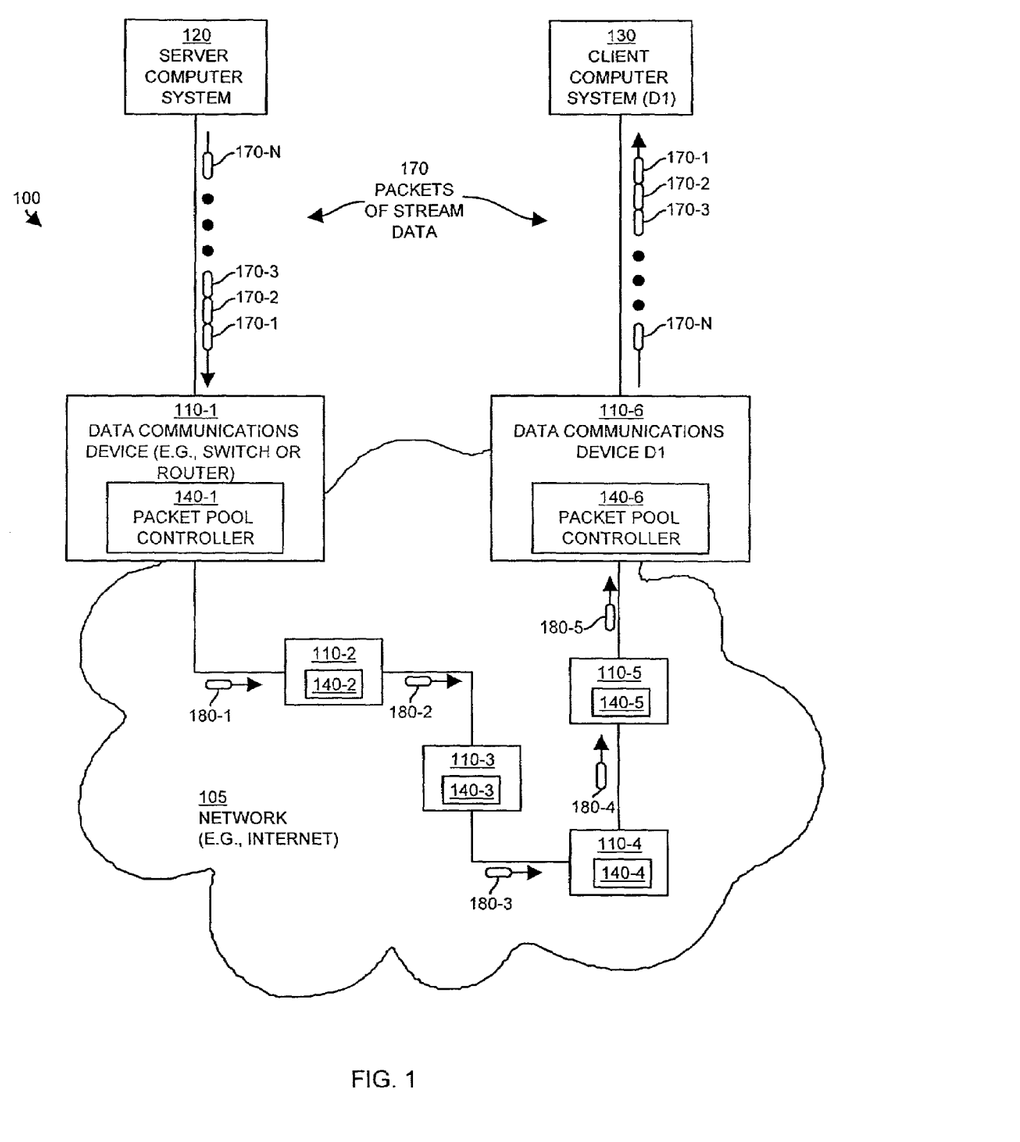
FIG. 1 illustrates an example networked computing system environment including data communications devices that operate packet pool controllers configured according to embodiments of the invention.

FIG. 1 illustrates a computer network environment 100 suitable for use in further explaining example embodiments of the invention. As illustrated, a computer network 105 such as the Internet includes an interconnection of a plurality of data communications devices 110-1 through 110-6. The data communications devices 110 may be any type of network communications device such as a router, switch, hub, gateway, bridge or any other device which can propagate data packets within the computer network 105. Each data communications device 110 in this example includes a packet pool controller 140 configured according to one embodiment of the invention. A server computer system 120 is coupled to the data communications device 110-1 and serves stream data as a series of packets 170-1 through 170-N. A client computer system 130 is coupled to the data communications device 110-6 and receives the packets of stream data 170-1 through 170-N transported through the network according to the techniques explained herein. The packets of stream data 170 can be any type of data or content such as audio data, video data, multimedia data or other content and may be served by server computer system 120 to the client computer system 130 either in real-time or non-real-time.

Generally, and as will be explained in more detail, the packet pool controller 140-1 within the data communications device 110-1 operates to create or form one or more pooled packets of stream data 180-1 that contain an aggregation of two or more packets of stream data 170 served by the server computer system 120. Since each of the packets of stream data 170 are destined to be routed to a common destination within the computer network 105 (i.e., to the client computer system 130), the packet pool controller 140 identifies these packets of stream data 170 as candidates to be aggregated into pooled packets 180. In addition, since each of the packets of stream data 170 are considerably smaller than the maximum size allowable for a single packet of data within the computer network 105, two or more representations of the packets of stream data 170 may be combined into a single pooled packet of stream data 180. As a specific example, each packet of stream data 170 may be approximately 300 bytes in size whereas the maximum packet size allowed within the network 105 may be 1500 bytes or more of payload data. As such, the packet pool controller 140 can combine two or more packets of stream data 170 into a single pooled packet 180.

Once created, the data communications device 110-1 transmits or forwards the pooled packets 180 towards the common destination which in this example is the data communications device 110-6 which is also equipped with a packet pool controller 140-6 configured according to embodiments of the invention. Each data communications device 110-2 through 110-5 in the network can further route the pooled packets towards the data communications device 110-6.

When the pooled packets 180-5 reached the packet pool controller 140 within the data communications device 110-6, the packet pool controller 140 depools or extracts each packet of stream data 170 from the received pooled packets 180-5 and forwards the extracted packets of stream data 170-1 through 170-N to the client computer system 130. In this manner, the packet pool controller 140 significantly reduces the interrupt and header overhead processing required within each of the data communications devices 110-2 through 110-5 that would otherwise be required to transfer the packets of stream data 170 individually through the computer network 105.

It is to be understood that the illustration in FIG. 1 is an example only and shows a single server computer system 120 serving a single stream of data 170 to a single client computer system 130 for ease of description of this example. The invention is equally applicable in situations involving multiple server and client computer systems exchanging the same or many independent streams of stream data in which cases some of such packets of stream data may share a portion of the same network route through the network 105 and may be pooled into pooled packets 180.

Figure 2:
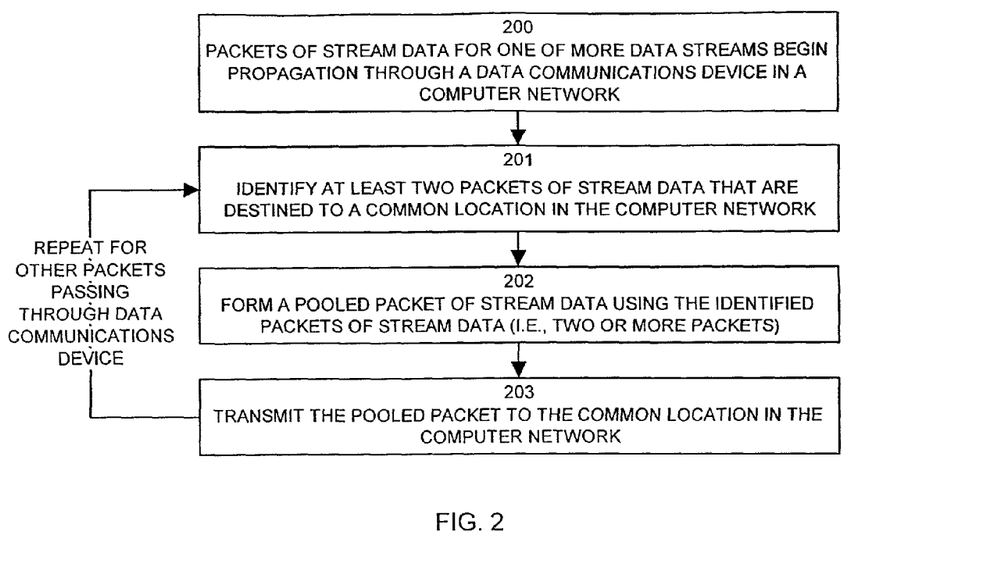
FIG. 2 is a flow chart of processing steps performed by a data communications device equipped with a packet pool controller to form pooled packets from two or more packets of stream data according to one embodiment of the invention.

FIG. 2 illustrates a flow chart showing the high-level processing steps and operations performed by a packet pool controller 140 configured according to one embodiment of the invention in order to create and transmit pooled packets 180 for one or more packets of stream data 170. Referring back to FIG. 1, assume for this example description that the packet pool controller 140-1 operating within the data communications device 110-1 is performing the operations discussed with respect to the flow chart in FIG. 2.

In step 200, packets of stream data 170 for one or more data streams begin propagation through a data communications device 110-1 within a computer network 105.

In step 201, the packet pool controller identifies at least two packets of stream data (e.g., 170-1, 170-2 and so forth) that are destined (i.e., that are to be routed towards) a common location within the computer network 105. In the example in FIG. 1, that common location happens to be the client computer system 130. In other configurations of the invention as will be explained later, the common location shared by some packets identified within step 201 may be different by some number of network hops than other packets also identified within step 201. However, all of the packets identified in step 201 share at least one network hop (i.e., to data communications device 110-2) with each other in relation to the current data communications device 110-1 operating the packet pool controller 140 that is processing step 201.

In step 202, the packet pool controller 140 forms a pooled packet of stream data 180 using the identified packets of stream data 170. The particulars of forming a pooled packet of stream data 180 will be explained in more detail with respect to the remaining figures.

Next, in step 203, the packet pool controller 140 transmits the pooled packet 180 towards the common location in computer network 105. In the example illustrated in FIG. 1, the packet pool controller 140 causes the data communications device 110-1 to transmit the pooled packet 180-1 to the data communications device 110-2. The pooled packet 180-1 may be addressed to the data communications device 110-6.

The packet pool controller 140-1 repeats the processing of step 201 through 203 for other packets of stream data 170 passing through the data communications device 10-1. The other packets of stream data 170 may or may not be for the same stream of stream data.

Figure 3:
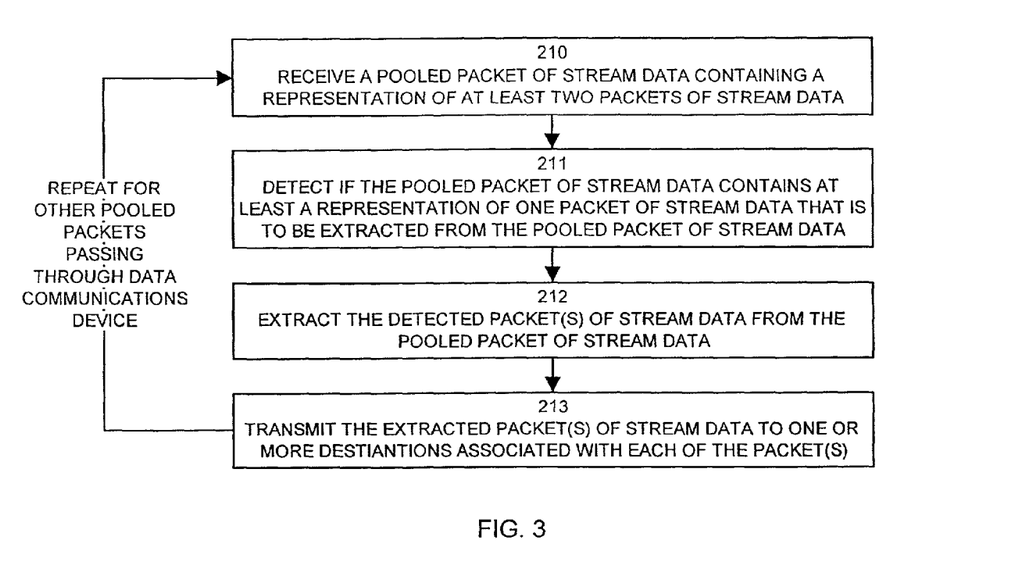
FIG. 3 is a flow chart of processing steps performed by a data communications device equipped with a packet pool controller to extract one or more packets of stream data from a pooled packet according to one embodiment of the invention.

FIG. 3 illustrates a flow chart of processing steps or operations performed by a packet pool controller such as 140-6 operating within the data communications device 110-6 in order to receive a pooled packet of stream data 180 and to extract one or more aggregated individual packets of stream data 170 contained therein.

In step 210, the packet pool controller 140 receives a pooled packet of stream data 180 (e.g., 180-5 in this example) containing a representation of at least two packets of stream data 170. By "representation", what is meant is that the pooled packet of stream data can contain either the entire contents of a packet of stream data 170 including its header (e.g., an IP header), addressing information, error correction information and other packet and/or protocol information or, in an alternative embodiment of the invention, the pooled packet of stream data 180 can contain a representation of the packets of stream data 170 that comprises only the payload of the stream data itself taken from the individual packets of stream data 170. In other words, in one embodiment of the invention, the pooled packet of stream data 180 can contain an aggregation of just the stream data from each packet of stream data 170. In such instances, it may be unnecessary to include packet header information for each packet of stream data 170 from which the pooled packet 180 is formed since each packet of stream data 170 is destined for the same common location, such as the client computer system 130 in this simple example. The recipient data communications device 110 of the pooled packet (i.e., the data communications device to which the pooled packet 180 is addressed) can be preconfigured with knowledge of where the aggregation of stream data within the pooled packet is to be transferred next (i.e., to the client 130).

In another scenario, each packet of stream data 170 is associated with a different destination or is associated with a different data stream. In such cases, the pooled packet 180 can contain a more robust representation of each packet of stream data 170 which can include packet header information, protocol information, or any combination thereof or may contain the entire packet of stream data 170 in its complete or unmodified form.

In step 211, the packet pool controller 140 detects that the pooled packet of stream data contains at least one packet of stream data 170 (i.e., at least one representation of at least one packet of stream data) that is to be extracted from the pooled packet of stream data 180. As noted above, in one embodiment of the invention, the pooled packet of stream data 180 can contain individual packets of stream data 170, all of which are destined for the same common location in which case the processing step 211 detects that all of the representations of packets of stream data 170 within the pooled packet 180 are to be extracted from the pooled packet 180. In an alternative embodiment of the invention, it may be the case that certain individual packets of stream data 170 represented within the pooled packet of stream data 180 are to be extracted within the current data communications device 110 that is performing the processing operations shown in FIG. 3, while other representations of packets of stream data 170 within the pooled packet 180 are not to be extracted from the pooled packet 180 within this particular data communications device 110. For this discussion, consider the simpler example in which all of the packets of stream data 170 represented within a single pooled packet of stream data 180 are to be extracted from the pooled packet 180.

Next, in step 212 the packet pool controller 140 extracts the detected packets of stream data 170 from the pooled packet of stream data 180. Details of this extraction process will be provided later. Generally however, the processing of step 212 results in the re-creation, regeneration or extraction of complete packets of stream data 170 including the extraction or creation of individual packet headers (e.g., IP headers) as well as any other protocol information or payload data associated with the individual packets of stream data 170 that are encapsulated or aggregated within the pooled packet 180.

In step 213, the packet pool controller 140 transmit the extracted packets of stream data 170 to one or more destinations associated with each of those packets 170. Thereafter, processing returns to step 210 in order to process the next received pooled packet of stream data 180.

In this manner, a packet pool controller 140 configured according to embodiments of the invention is able to depool individual packets of stream data 170 contained within pooled packets 180 to thus re-create or regenerate the original stream data 170.

Figure 4:
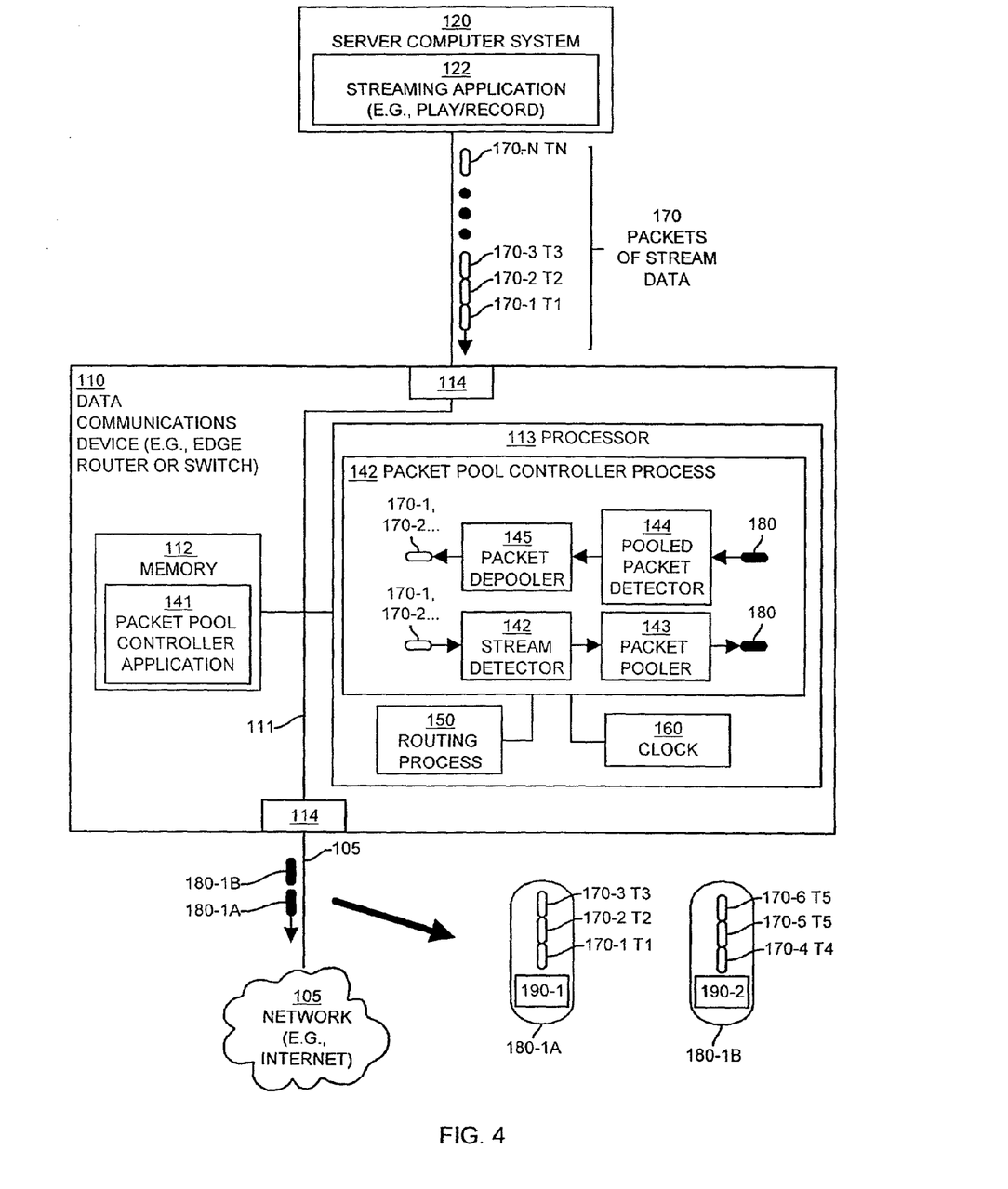
FIG. 4 illustrates an example architecture and data flow of operation of a packet pool controller process manager within a data communications device configured according to one example embodiment of the invention.

FIG. 4 illustrates a more detailed architecture of a data communications device 110 configured according to one embodiment of the invention. FIG. 4 also illustrates a data flow diagram showing the flow of packets of stream data 170 into a data communications device 110 for which the pooled packets 180-1A and 180-1B are created.

The data communications device 110 in this example embodiment of the invention includes an interconnection mechanism 111 such as a data bus or circuitry that interconnects a memory 112, a processor 113 and one or more communications interfaces 114. The memory 112 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 112 is encoded with logic instructions and/or data that form a packet pool controller application 141 configured according to embodiments of the invention. In other words, the packet pool controller application 141 represents software code, instructions and/or data that reside within memory or storage or within any computer readable medium accessible to the data communications device 110. The processor 113 represents any type of circuitry or processing device such as a central processing unit or application-specific integrated circuit that can access the packet pool controller application 141 encoded within the memory 112 over the interconnection mechanism 111 in order to execute, run, interpret, operate or otherwise perform the packet pool controller application 141 logic instructions. Doing so forms the packet pool controller process 142. In other words, the packet pool controller process 142 (represented in FIG. 1 generally as the packet pool controller 140) represents one or more portions of the logic instructions of the packet pool controller application 141 while being executed or otherwise performed on, by or in the processor 113 within the data communications device 110.

The example packet pool controller process 142 includes a number of components also illustrated in FIG. 4. In this example embodiment, the packet pool controller process 142 includes an stream detector 142 and a packet pooler 143 which collectively operate to detect packets of stream data 170 destined for a common location in the computer network 105 in order to create pooled packets 180. The packet pool controller process 142 also includes a pooled packet detector 144 coupled to a packet depooler 145 which collectively operate to detect incoming pooled packets 180 which arrive at the data communications device 110 and which operate to extract, if necessary, packets of stream data 170 from these incoming pooled packets 180 according to embodiments of this invention. Generally, the combination of the stream detector 142 and the packet pooler 143 perform the processing operations discussed above with respect to FIG. 2 whereas the combination of the pooled packet detector 144 and the packet depooler 145 perform the processing operations discussed above with respect to FIG. 3.

Also shown in this example, the packet pool controller process 142 is capable of communicating with a routing process 150 and a clock mechanism 160 operating within the data communications device 110. As will be explained, the packet pool controller process 142 can obtain routing path information for individual packets of stream data 170 arriving within the data communications device 110 on a communications interface 114. Using the routing information obtained from the routing process 150 for two or more packets of stream data 170, the packet pool controller process 142 can determine if two packets of stream data (e.g., 170-1 and 172) share a common network route or path from the data communications device 110 onto the network 105 for one or more network hops.

The packet pool controller process 142 can access the clock mechanism 160 in order to make the aforementioned determination if two or more packets of stream data 170 arrive at the data communications device 110 within a predetermined window of time referred to herein as the packet pooling window. In other words, as packets of stream data 170 arrive at a data communications device 110 from a streaming application 122 operating within the server computer system 120, the packet pool controller process 142 can examine each packet of stream data 170 that arrives within a predetermined packet pooling window of time to determine if routing information obtained from the routing process 150 indicates that two or more of these packets 170 share a common network path to a common location within the network 105. If this is the case, the stream detector 142 can pass these packets 170 to the packet pooler 143 for creation of a pooled packet 180 for transmission onto the network 105 towards the common destination that these packets 170 share. Once two or more packets of stream data have been identified as candidates for creation of a pooled packet 180, subsequent packets of stream data 170 that arrive within the packet pooling window can also be pooled within this pooled packet of stream data 180 if they also share this network path.

According to one embodiment of the invention, it may be a requirement that all packets of stream data within a single pooled packet 180 share the same common destination. In an alternative embodiment, it may be the case that once two packets of stream data 170 has been identified as sharing network path to a common location and are thus candidates for entry or aggregation into a single pooled packet of stream data 180, subsequent packets of stream data 170 that arrive before expiration of the packet pooling window of time and that share at least a portion of the entire network path of the two packets of stream data already entered into the pooled packet 180 can also be combined into this pooled packet 180. In such cases, the pooled packet index 190 can indicate that such packets of stream data 170 are to be extracted prior to propagation of the pooled packet 180 to its final destination. In other words, in this alternative configuration, some packets 170 represented within a pooled packet 180 may share a complete network path towards a common destination while other packets might share only a portion of this network path.

FIG. 4 also illustrates an expanded view of the contents of two pooled packets 180-1A and 180-1B. In this example, pooled packet 180-1A contains an aggregation of three packets of stream data 170-1 through 170-3. Each packet of stream data 170 in the example in FIG. 4 further includes an indication of a relative respective time T1 through TN that represents the arrival time of the packet 170 at the data communications device 110. The packet pool controller process 142 can utilize these arrival times T1 through TN to determine which packets of stream data 170 arrive within the pooling time window and are thus able to be pooled within a single pooled packet of stream data 180.

The determination of how many packets of stream data 170 can be included within a single pooled packet 180 can be based on a variety of factors. As an example, the packet pool controller process 142 may decide to pool two packets if detecting the first packet and detecting the second packet occur in relation to each other within the pooling time window such that forming a pooled packet 180 forms a pooled packet from only those packets 170 that arrives within the pooling time window and that are destined along at least a portion of a path towards a common location in the computer network. As an example, the arrival times T1, T2 and T3 of packets of stream data 170-1 through 170-3 all occur before the expiration of a single pooling time window since the single pooled packet 180-1A contains each of these packets in the example illustrated in FIG. 4.

Another criteria that the packet pool controller process 142 can use to determine which packets of stream data 170 are combined into a single pooled packet 180, besides arrival within a pooling time window, is to determine if two or more packets of stream data 170 share a predetermined number of common network hops. As an example, the minimum hop requirement might be three or more network hops which two or more packets of stream data 170 must share in order to be combined into a single pool packet 180.

Yet another criteria that the packet pool controller process 142 can use to determine which packets of stream data may be combined into a single pooled packet 180 is the size of the packets of stream data 170. In a computer network that operates a protocol such as the Internet Protocol (IP), the maximum packet size is set to a value of approximately 1500 bytes. Accordingly, assuming a large enough number of packets of stream data 170 arrive within the predetermined pooling time window, the limiting factor to how many packets of stream data 170 that may be placed into a single pooled packet 180 may be governed by the cumulative or total collective size of each of the representations of packets of stream data 170 that are to be placed within a single pooled packet 180 so as not to allow the pooled packet 180 to exceed the maximum packet size limit. The packet pool controller process 142 can identify packets 170 to be included within the pooled packet 180 to have sizes that meet the predetermined size requirement such that a sum of sizes of the packets 170 that form the pooled packet 180 do not exceed the maximum packet size allowed within the network 105. In other words, the packet pool controller process 142 can be configured to only allow packets 170 that each individually meet the minimum size requirement such as each being smaller than 300 bytes apiece in order to be included within a pooled packet 180. In such instances, any packets of stream data 170 that exceed the 300 bytes minimum size requirement may be routed individually through the network 105 and will not be included within a pooled packet 180.

It is to be understood that these criteria are given as examples only and are not limiting to the scope of embodiments of the invention. It is also to be understood that each of these packet pooling criteria including arrival of packets 170 within a pooling time window, sharing of the predetermined number of network hops, and meeting of a minimum size requirement can be used alone or in combination with each other to create various packet pooling criteria rules to which the packet pool controller process 142 can be configured.

It is also to be understood that the packet pool indexes 190-1 and 190-2 shown within the pooled packets 180 are shown by example only. According to alternative embodiments of the invention, the pooled packet indexes 190 may be contained within a separate packet which may be transmitted from the data communications device 110 towards the common destination out of band from the pooled packet 180. In this manner, additional space may be provided within the pooled packet 180 for other packets of stream data 170. Such an embodiment of the invention may be particularly useful in situations in which the sizes of packets of stream data 170 are fixed or known ahead of time and in which all packets of stream data 170 share the same common destination. In such cases, it need not be a requirement of embodiments of the invention to include a pooled packet index 190 within each pooled packet 180. Instead, the packet pool controller process 142 can be pre-configured with packet pool index information so as to not require each pooled packet to contained the pooled packet index 190.

Figure 5A:
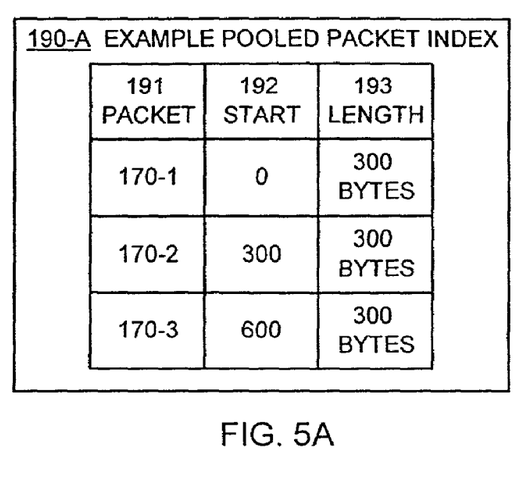
FIG. 5 is a flow chart showing the details of operation of a data communications device operating a packet pool controller to create pooled packets according to one example embodiment of the invention.
Figure 5B:
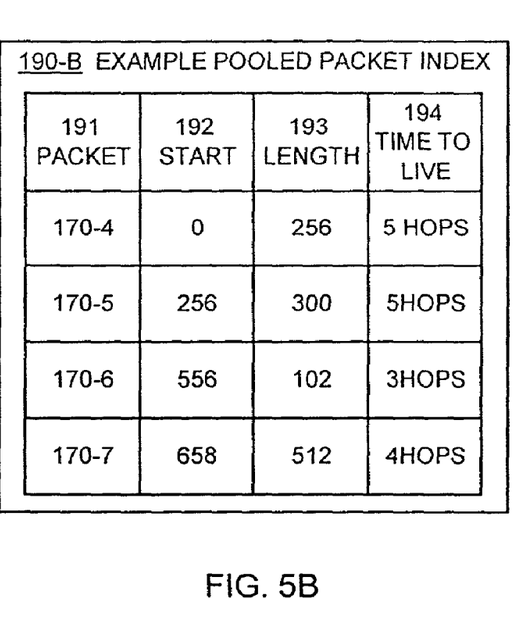

FIGS. 5A and 5B illustrate examples of pooled packet indexes 190-A and 190-B that the packet pool controller process 142 can create according to example embodiments of the invention.

In the pooled packet index 190-A shown in FIG. 5A, a representation of each packet 170 within a pooled packet 180 is identified 191 along with a corresponding starting location 192 identifying a starting point for the data of that packet representation 170 within the pooled packet 180, and with a corresponding length 193 that indicates the length of the data within the pooled packet 180 for that representation of that packet 170. In this example, the packet of stream data 170-1 begins at pooled packet payload location zero (0) and is 300 bytes in length. The packet of stream data 170-2 begins at payload location 300 and extends another 300 bytes. The packet of stream data 170-3 begins at location 600 within the payload or data portion of the pooled packet 180 and extends a final 300 bytes. Using the example pooled packet index 190-A, the packet pool controller process 142 is able to receive a pooled packet 180 which is addressed to the data communications device 110 in which the packet pool controller process 142 operates and is able to extract each individual packet of stream data 170-1 through 170-3 from the pooled packet 180.

The second example pooled packet index 190-B illustrated in FIG. 5B shows an alternative packet pool index configured according to an alternative embodiment of the invention. The pooled packet index 190-B can be used to identify different packets of stream data 170 within a single pooled packet 180 but which share different portions of a network path towards a common destination within a computer network 105. The indication of which packets of stream data 170 are to share which portions of a shared network path is provided by the time to live field 194 within this example pulled packet index 190-B. More specifically, in this example, the pooled packet index 190-B identifies four different packets of stream data 170-4 through 170-7 encapsulated within a single pooled packet 180, each of which are a different size and some of which share the common number of network hops while others share less than the entire shared network path.

In particular, the two packets of stream data 170-4 and 170-5 have a time to live value of five network hops indicating that each packet of stream data 170-4 and 170-5 is destined for a common location which is five network hops away from the current data communications device 110 that is operating the packet pool controller process 142 at this point in time. It may be the case, for example, that the two packets of stream data 170-4 and 170-5 were first detected by a packet pool controller process 142 within a pooling time window thus causing the creation or formation of a pooled packet 180 to which this pooled packet index 190-B relates. Note however that the representation of the packet of stream data 170-6 only has a time to live field of three network hops indicating that this packet of stream data 170-6 only shares the remaining three network hops with the first two packets of stream data 170-4 and 170-5. Also note that the fourth representation of a packet of stream data 170-7 is of a different size that the other packets and only shares four remaining network hops. In other words, the pooled packet 180 represented by this example pooled packet index 190-B contains two packets that share five network hops, one packet that shares the first three of those five network hops and another packet that shares the first four of those five network hops.

As will be explained shortly, embodiments of the invention are able to receive a pooled packet 180 having a pooled packet index such as 190-B and are able to determine or identify which particular packets of stream data 170 are to be extracted from the pooled packet based on their respective time to live fields 194 indicating that they no longer share a common network path with other packets within the pooled packet 180.

Figure 6:
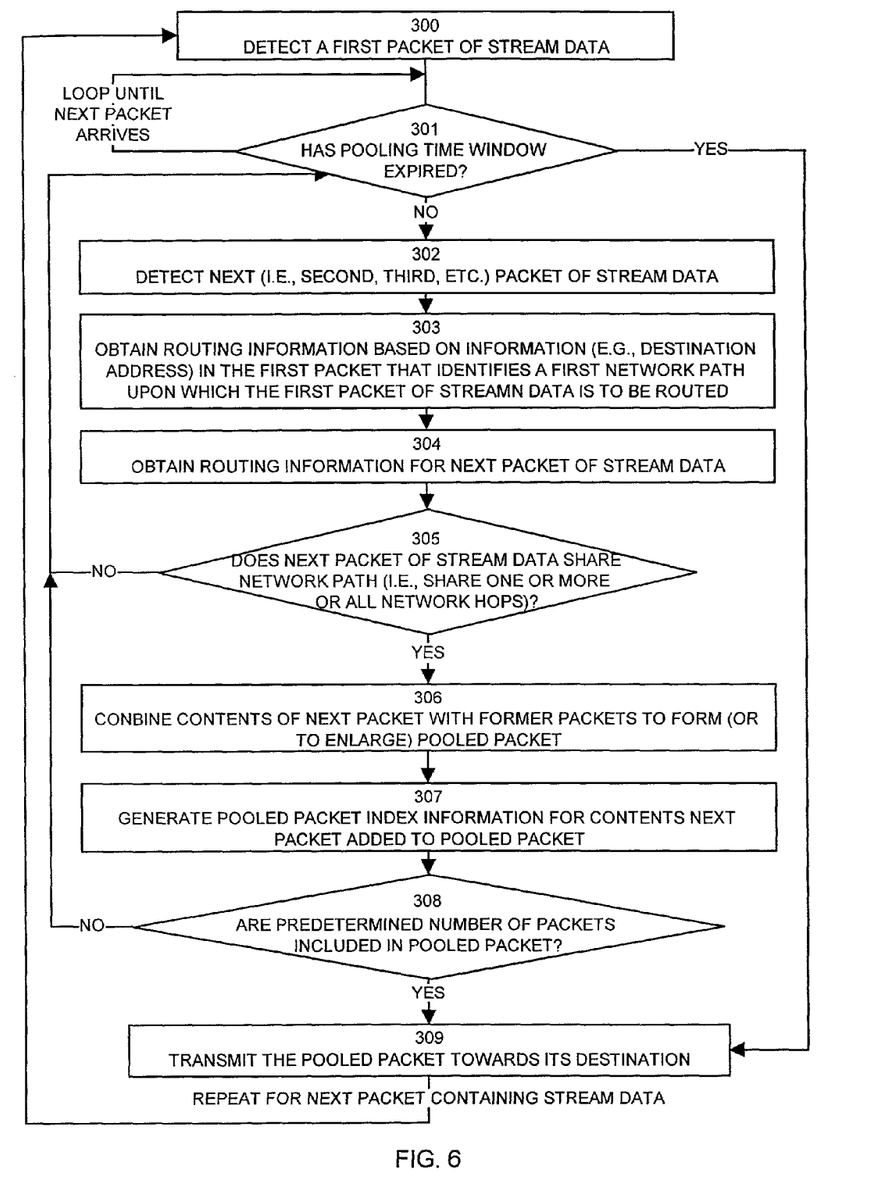
FIG. 6 is a flow chart showing the details of operation of a data communications device operating a packet pool controller to extract one or more packets of stream data from a pooled packet according to one example embodiment of the invention.

FIG. 6 is a flow chart of processing steps showing the details of processing operations performed according to one embodiment of a packet pool controller process 142 operating within a data communications device 110 configured according to one embodiment of the invention. The processing operations shown in FIG. 6 illustrate example details of processing that can detect individual packets of stream data 170 and that can form and transmit a pooled packet 180 containing those individual packets 170.

In step 300, the packet pool controller process 142 detects a first packet of stream data such as packet 170-1 from the former examples.

Next, in step 301, the packet pool controller process 142 determines if a pooling time window has expired prior to the arrival of another packet of stream data 170. If the pooling time window has not expired and if no new packet of stream data 170 has arrived, the packet pool controller process 142 continues to loop until either the expiration of the pooling time window or until a packet 170 arrives. If expiration of the pooling time window occurs and no new packet of stream data 170 has arrived, processing proceeds to step 309 at which point the packet pool controller process 142 transmits the single first packet of stream data (e.g., 170-1) detected in step 300 towards its destination (not as a pooled packet however). Alternatively, if in step 301 the pooling time window has not expired and another packet of stream data 170 arrives, processing proceeds to step 302.

In step 302, the packet pool controller process 142 detects the next (i.e., the second, third, fourth and so forth) packet of stream data 170 to arrive at the data communications device 110.

In step 303, the packet pool controller process 142 obtains routing information (i.e., from the routing process 150) based on information such as a destination address of the first packet (e.g., 170-1) that identifies a first network path upon which the first packet of stream data is to be routed. As an example, the packet pool controller process 142 can communicate with the routing process 150 to obtain information from the routing protocol link state database which may be maintained by a routing protocol such as the Open Shortest Path First (OSPF) routing protocol operating in the data communications device 110. This routing information provides hop by hop network path information for the first packet of stream data 170-1.

In step 304, the packet pool controller process 142 performs a similar operation to obtain routing information for the next packet of stream data 170-2 detected in step 302.

In step 305, the packet pool controller process 142 makes a determination if the next packet of stream data (i.e., 170-2) shares a network path (i.e., shares one or more or all network hops) with the first packet of stream data 170-1. If the new or next packet of stream data (i.e., 170-2) does not share some or all of the network path of packets (e.g., 170-1) that currently are candidates within the pooled packet 180 (the network path being measured beginning at the current data communications device 110), the processing proceeds back to step 301.

However, in step 305, if the next packet of stream data 170-2 does share a network path with the first packet of stream data 170-1, processing proceeds to step 306. The exact number of hops that constitute "sharing" of a network path between the first packet of stream data 170-1 and a next packet of stream data (e.g., 170-2, 170-3, and so forth) can be configured to various values depending upon the circumstances. A high-value results in the pooling of only those packets which share a large number of network hops with each other whereas a low value such as one (1) results in pooling of packets of stream data which share only a single network hop or more.

In step 306, the packet pool controller process 142 combines the contents of the next packet of stream data (e.g., 172) with former packets to form or to enlarge a pooled packet 180 of stream data. In this manner, the contents of packets of stream data 170 that arrive within a pooling time window and that share a portion of a network path with each other can be entered into the pooled packet 180. On the first iteration of the processing shown in FIG. 6, the processing to step 306 initially creates or forms the pooled packet 180 to include the contents of the first packet of stream data 170-1 as well as the second packet of stream data 170-2. However, in a successive iterations of step 306, only the contents of the next packet of stream data (e.g., 170-3) is combined within the pooled packet 180.

Next, in step 307, the packet pool controller process 142 generates the pooled packet index information for the contents of the stream data packet 170 added to the pooled packet 180. As previously explained with respect to FIGS. 5A and 5B, the pooled packet index identifies where the contents of representations of packets of stream data 170 reside within the pooled packet 180. In an embodiment in which packets of stream data 170 in a pooled packet can share different portions of a common network path, the packet pool controller process 142 also sets the time to live field for the contents of a packet of stream data 170 added to the pooled packet 180 at this iteration of step 307. Specifically, the time to live field 194 is set to be equal to the number of continous network hops which are shared with other packets in the pooled packet 180.

Next, in step 308, the packet pool controller process 142 determines if a predetermined number of packets 170 are included in the pooled packet 180. In this configuration then, a limit can be placed on the total number of packets of stream data 170 they can be included in a single pooled packet 180. It is to be understood that this processing in step 308 is optional and is not required to be included in embodiments of the invention but is shown here for completeness. If the predetermined number of packets 170 within the pooled packet 180 has not yet been reached, processing proceeds back to step 301 in order to repeat the aforementioned processing. If the predetermined number of packets is now included within the pooled packet 180 then processing proceeds to step 309.

In step 309, the packet pool controller process 142 causes the data communications device 110 to transmit the pooled packet 180 towards its destination and then processing returns to step 300 to repeat the aforementioned processing for the next packet of stream data 170.

In this manner, this embodiment of the invention is able to create pooled packets 180 containing two or more packets of stream data 170 that share some or all of the same network path.

Figure 7:
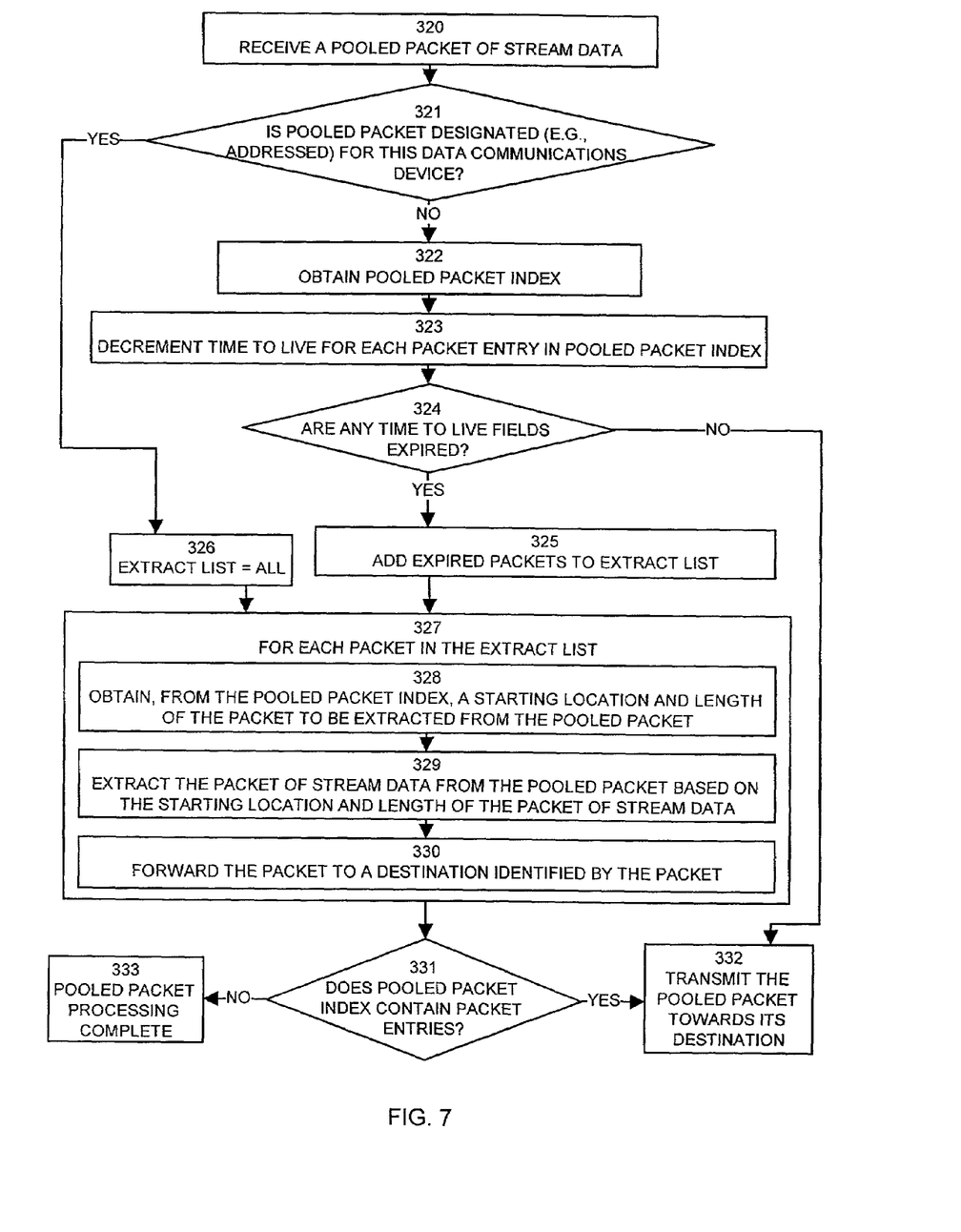
FIG. 7 is a flow chart of processing steps performed by a packet pool controller process to receive a pooled packet and extract packets of stream data from the pooled packet if necessary.

FIG. 7 illustrates a flow chart of processing steps performed by a packet pool controller process 142 operating within the data communications device 110 configured according to one embodiment of the invention to receive a pooled packet 180 and extract packets of stream data from the pooled packet if necessary.

In step 320, the packet pool controller process 142 receives a pooled packet of stream data 180.

In step numeral 321, the packet pool controller process 142 determines if the pooled packet 180 is designated (i.e., addressed) for this data communications device 110. In other words, in step 313, the packet pool controller process 142 determines if this is the end destination for the pooled packet 100. If this is the case, then the pooled packet 180 has reached its final destination and all packets of stream data 170 contained therein can be extracted. Accordingly, processing proceeds to step 326 to set an "extract list" identifying which packets of stream data 170 contained within the pooled packet 180 are to be extracted from this pooled packet 180 (all in this example).

In step 321, if the pooled packet 180 is not designated for this data communications device 110, then processing proceeds to step 322. In other words, if the pooled packet 180 has a destination address such as an IP address indicating another computer system or data communications device 110 that is not the same as the network address of the current data communications device 110 performing the processing of FIG. 7, then it may be assumed that only some or none of the packets of stream data 170 contained within this pooled packet 180 are to be extracted at this particular data communications device 110 performing the processing shown in FIG. 7.

In step 322, the packet pool controller process 142 obtains the pooled packet index 190 from within the pooled packet 180.

Next, in step 323, the packet pool controller process 142 decrements the time to live field 194 for each packet entry (i.e., each row) in the pooled packet index 190.

Next, in step 324, the packet pool controller process 142 determines if there are any time to live fields 194 for any packet entries (i.e., any rows) within the pooled packet index 190 that are expired (e.g., that are equal to zero). If any time to live fields are expired, then this indicates that packets of stream data 170 identified or corresponding to those time to live fields 194 are to now be extracted from the pooled packet 180. Conversely, if no time to live fields 194 are now expired, processing proceeds to step 332 in order to transmit the pooled packet 180 further towards its final destination. Assuming one or more time to live fields are expired in step 324, processing proceeds to step 325.

In step 325, the packet pool controller process 142 adds the identity of all expired packets (i.e., those packet having a time to live field 194 that is expired or is now set to zero) to the extract list. The extract list identifies those packets of stream data 170 that are to be extracted from the pooled packet within this data communications device 110.

Next, in step 327, the packet pool controller process 142 enters a processing loop which takes place for each packet identified within the extract list.

Within the loop of step 327, in step 328, the packet pool controller process 142 obtains, from the pooled packet index 190, a starting location 192 and length information 193 of the packet of stream data 170 to be extracted from the pooled packet 180.

Next, in step 329, the packet pool controller process 142 extracts the packet of stream data 170 from the pooled packet 180 based on a starting location and length information of the packet of stream data 170 as obtained in step 328 from the pooled packet index 190. Also in step 329, the packet pool controller process 142 can remove the index entry in the pooled packet index 190 for that packet of stream data 170.

In step 330, the packet pool controller process causes the data communications device 110 to forward that packet of stream data 170 (i.e., the extracted packet) to a destination identified by that packet (e.g., identified by a header extracted with the packet 170).

This processing of steps 328 through 330 is repeated for each packet in extraction list in order to extract either all of the packets of stream data 170 from the pooled packet in cases where the pooled packet has reached its final destination (i.e., processing from step 321 to 326), or in cases where only certain packets of stream data 170 aggregated within the pooled packet 180 are to be extracted at this point in propagation of the pooled packet 180 through the network 105.

After processing the extraction of each packet in the extract list in step 327, processing proceeds to step 331.

In step 331, the packet pool controller process 142 determines if the pooled packet index 190 still contains packet entries (i.e., rows for packets that still exist within the pooled packet 180). If the pooled packet index contains packet entries, processing proceeds to step 332 at which point the data communications device 110 transmits the pooled packet further towards its eventual end destination. Alternatively, in step 331, if the pooled packet index 190 does not contain any remaining packet entries, then all packets of stream data 170 have been extracted at this point from the pooled packet 180 and processing proceeds to step 333 at which point pooled packet processing is complete.

In this manner, the processing shown in FIG. 7 allows a data communications device 110 equipped with the packet pool controller process 142 to extract one or more packets of stream data 170 from the pooled packet 180. If the pooled packet still has representation of other packets 170 that remain un-extracted, the data communications device 110 is able to continue to forward the pooled packet 180 within the computer network 105.

As a result of the aforementioned processing of embodiments of the invention, such embodiments allow data communications devices 110 within a computer network to save significant amounts of processing time by decreasing the amount of interrupt handling and packet header overhead processing required since the number of packets to be transferred to a network can be significantly decreased by combining multiple packets of stream data 170 within a single pooled packet 180. It is to be understood that a data communications device configured according to embodiments of the invention can be a node in an Application Level Multicasting (ALM) network in which case the ALM nodes perform the pooling and de-pooling processing steps and operations of the embodiments noted above and forward the pooled packets between other ALM nodes over one or more hops through a conventional network such as an IP network like the Internet.

Those skilled in the art will understand that there can be many variations made to the embodiments explained above while still achieving the same objective of those embodiments and the invention in general. Such variations are intended to be covered by the scope of this invention. As such, the foregoing description of embodiments of the invention is not intended to be limiting. Rather, any limitations to the invention are presented in the following claims.

What is claimed is:

1. A method for transmitting stream data in a computer network, the method comprising the steps of:
   identifying at least two packets of stream data that are destined to a common location in a computer network;
   forming a pooled packet of stream data using the at least two packets of stream data wherein the step of forming a pooled packet comprises the steps of:
      combining contents of each of the at least two packets into the pooled packet; and
      generating a pooled packet index for the pooled packet, the pooled packet index indicating a location within the pooled packet of each of the at least two packets; and
   transmitting the pooled packet to the common location in the computer network, wherein the step of transmitting the pooled packet to the common location in the computer network includes transmitting the pooled packet index to the common location in the computer network.

2. The method of claim 1 wherein the step of identifying comprises the steps of:
   detecting a first packet of stream data; and
   obtaining routing information based on information in the first packet that identifies a first network path upon which the first packet of stream data is to be routed; and
   detecting at least one second packet of stream data containing information that indicates the second packet is also to be routed on the first network path.

3. The method of claim 2 wherein the first network path identifies a first predetermined number of network hops upon which the first packet is to be routed, and wherein the step of detecting at least one second packet comprises the steps of:
   detecting at least one second packet that is to be routed on the first network path for a second predetermined number of network hops that exist along the first network path.

4. The method of claim 3 wherein the first predetermined number of network hops is greater than or equal to the second predetermined number of network hops.

5. The method of claim 2 wherein the steps of detecting a first packet and detecting a second packet occur in relation to each other within a pooling time window such that the step of forming a pooled packet forms a pooled packet from only those packets that arrive within the pooling time window and that are destined towards a common location in the computer network.

6. The method of claim 1 wherein the step of identifying further comprises the step of:
identifying a predetermined number of packets to be included in the at least two packets, such that step of forming forms a pooled packet that contains the predetermined number of packets destined to a common location in a computer network.

7. The method of claim 1 wherein the step of identifying comprises the step of:
identifying packets to be included in the at least two packets that have sizes that meet a predetermined size requirement, such that a sum of sizes of the at least two packets that form the pooled packet does not exceed a maximum packet size.

8. The method of claim 1 wherein the location of each of the at least two packets in the pooled packet indicates a starting position of each of the at least two packets in the pooled packet and wherein the pooled packet index indicates a length of each of the at least two packets in the pooled packet.

9. The method of claim 1 wherein the pooled packet index includes at least one time to live indicator indicating a number of network hops along a route towards the common location in the computer network that at least one packet in the pooled packet is to be transmitted.

10. The method of claim 1 wherein the at least two packets are encoded to be transported through the computer network using a stream transfer protocol.

11. The method of claim 1 wherein said generating a pooled packet index comprises generating a pooled packet index including a representation of each packet, a packet starting point for each packet and a packet length for each packet.

12. The method of claim 11 further comprising including a time to live value for each packet of said pooled packet in said pooled packet index.

13. A method for transmitting stream data in a network, the method comprising the steps of:
receiving, at a first destination in the computer network, a pooled packet of stream data containing a representation of at least two packets of stream data and a pooled packet index for the pooled packet the Pooled packet index indicating a location within the pooled packet of each of the at least two packets;
detecting if the pooled packet of stream data contains at least one packet of stream data that is to be extracted from the pooled packet of stream data at the first destination, and if the at least one packet of stream data is to be extracted from the pooled packet:
extracting the at least one packet of stream data from the pooled packet; and
transmitting the extracted at least one packet of stream data to a destination associated with the at least one packet.

14. The method of claim 13:
wherein the step of receiving comprises the step of decrementing a time to live indicator within the pooled packet; and
wherein the step of detecting detects that the pooled packet of stream data contains at least one packet of stream data that is to be extracted from the pooled packet if the time to live indicator within the pooled packet has expired.

15. The method of claim 13 wherein the step of detecting detects that the pooled packet of stream data contains at least one packet of stream data that is to be extracted from the pooled packet if a destination indicator in the pooled packet is equal to a destination location of the first destination in the computer network.

16. The method of claim 13 wherein the step extracting the at least one packet of stream data from the pooled packet comprises the steps of:
obtaining, from a pooled packet index in the pooled packet, a starting location and length of the at least one packet of stream data in the pooled packet; and
extracting the at least one packet of stream data from the pooled packet based on starting location and length of the at least one packet of stream data.

17. A data communications device comprising:
at least one communications interface;
a memory;
a processor; and
an interconnection mechanism coupling the at least one communications interface, the memory and the processor;
wherein the memory is encoded with a packet pool controller application that when performed on the processor, produces a packet pool controller process that causes the data communications device to transmit stream data in a computer network by performing the operations of:
identifying at least two packets of stream data that are destined to a common location in a computer network;
forming a pooled packet of stream data using the at least two packets of stream data;
generating a pooled packet index for the pooled packet, the pooled packet index indicating a location within the pooled packet of each of the at least two packets; and
transmitting, via the at least one communications interface, the pooled packet to the common location in the computer network and wherein the step of transmitting the pooled packet to the common location in the computer network includes transmitting the pooled packet index to the common location in the computer network.

18. The data communications device of claim 17 wherein when the packet pool controller process causes the data communications device to perform the operation of identifying, the packet pool controller process causes the data communications device to perform the operations of:
detecting a first packet of stream data; and
obtaining routing information based on information in the first packet that identifies a first network path upon which the first packet of stream data is to be routed; and
detecting at least one second packet of stream data containing information that indicates the second packet is also to be routed on the first network path.

19. The data communications device of claim 18 wherein the first network path identifies a first predetermined number of network hops upon which the first packet is to be routed, and wherein when the packet pool controller process causes the data communications device to perform the operation of detecting at least one second packet, the packet pool controller process causes the data communications device to perform the operation of:

detecting at least one second packet that is to be routed on the first network path for a second predetermined number of network hops that exist along the first network path.

20. The data communications device of claim 19 wherein the first predetermined number of network hops is greater than or equal to the second predetermined number of network hops.

21. The data communications device of claim 18 wherein the operations of detecting a first packet and detecting a second packet occur in relation to each other within a pooling time window such that the operation of forming a pooled packet forms a pooled packet from only those packets that arrive within the pooling time window and that are destined towards a common location in the computer network.

22. The data communications device of claim 17 wherein when the packet pool controller process causes the data communications device to perform the operation of identifying, the packet pool controller process causes the data communications device to perform the operation of:

identifying a predetermined number of packets to be included in the at least two packets, such that step of forming forms a pooled packet that contains the predetermined number of packets destined to a common location in a computer network.

23. The data communications device of claim 17 wherein when the packet pool controller process causes the data communications device to perform the operation of identifying, the packet pool controller process causes the data communications device to perform the operation of:

identifying packets to be included in the at least two packets that have sizes that meet a predetermined size requirement, such that a sum of sizes of the at least two packets that form the pooled packet does not exceed a maximum packet size.

24. The data communications device of claim 17 wherein the location of each of the at least two packets in the pooled packet indicates a starting position of each of the at least two packets in the pooled packet and wherein the pooled packet index indicates a length of each of the at least two packets in the pooled packet.

25. The data communications device of claim 17 wherein the pooled packet index includes at least one time to live indicator indicating a number of network hops along a route towards the common location in the computer network that at least one packet in the pooled packet is to be transmitted.

26. The data communications device of claim 17 wherein the at least two packets are encoded to be transported through the computer network using a stream transfer protocol.

27. The data communications device of claim 17 wherein said pooled packet index comprises a representation of each packet, a packet starting point for each packet and a packet length for each packet.

28. The data communications device method of claim 27 wherein said pooled packet index further includes a time to live value for each packet of said pooled packet.

29. A data communications device comprising:
  at least one communications interface;
  a memory;
  a processor; and
  an interconnection mechanism coupling the at least one communications interface, the memory and the processor;
  wherein the memory is encoded with a packet pool controller application that when performed on the processor, produces a packet pool controller process that causes the data communications device to transmit stream data in a computer network by performing the operations of:
  receiving via the at least one communications interface operating as a first destination in the computer network, a pooled packet of stream data containing a representation of at least two packets of stream data and a pooled packet index for the pooled packet, the pooled packet index indicating a location within the pooled packet of each of the at least two packets;
  detecting if the pooled packet of stream data contains at least one packet of stream data that is to be extracted from the pooled packet of stream data at the first destination, and if the at least one packet of stream data is to be extracted from the pooled packet:
    extracting the at least one packet of stream data from the pooled packet; and
    transmitting the extracted at least one packet of stream data to a destination associated with the at least one packet.

30. The data communications device of claim 29:
  wherein when the packet pool controller process causes the data communications device to perform the operation of receiving, the packet pool controller process causes the data communications device to perform the operation of decrementing a time to live indicator within the pooled packet; and
  wherein when the packet pool controller process causes the data communications device to perform the operation of detecting, the data communications device detects that the pooled packet of stream data contains at least one packet of stream data that is to be extracted from the pooled packet if the time to live indicator within the pooled packet has expired.

31. The data communications device of claim 29 wherein when the packet pool controller process causes the data communications device to perform the operation of detecting, the data communications device detects that the pooled packet of stream data contains at least one packet of stream data that is to be extracted from the pooled packet if a destination indicator in the pooled packet is equal to a destination location of the first destination in the computer network.

32. The data communications device of claim 29 wherein when the packet pool controller process causes the data communications device to perform the operation of extracting the at least one packet of stream data from the pooled packet, the packet pool controller process causes the data communications device to perform the operation of:
  obtaining, from a pooled packet index in the pooled packet, a starting location and length of the at least one packet of stream data in the pooled packet; and
  extracting the at least one packet of stream data from the pooled packet based on starting location and length of the at least one packet of stream data.

33. A computer program product having a computer-readable medium including computer program logic encoded thereon that, when performed on a computer system having a coupling of a memory, a processor, and at least one communications interface, causes the computer system to transmit stream data in a computer network by performing the operations of:

identifying at least two packets of stream data that are destined to a common location in a computer network;

forming a pooled packet of stream data using the at least two packets of stream data;

generating a pooled Packet index for the pooled packet, the pooled packet index indicating a location within the pooled packet of each of the at least two packets; and     transmitting the pooled packet to the common location in the computer network, wherein the step of transmitting the pooled packet to the common location in the computer network includes transmitting the pooled packet index to the common location in the computer network.

34. A computer program product having a computer-readable medium including computer program logic encoded thereon that, when performed on a computer system having a coupling of a memory, a processor, and at least one communications interface, causes the computer system to transmit stream data in a computer network by performing the operations of:

receiving via the at least one communications interface operating as a first destination in the computer network, a pooled packet of stream data containing a representation of at least two packets of stream data and a pooled packet index for the pooled packet, the pooled packet index indicating a location within the pooled packet of each of the at least two packets;

detecting if the pooled packet of stream data contains at least one packet of stream data that is to be extracted from the pooled packet of stream data at the first destination, and if the at least one packet of stream data is to be extracted from the pooled packet:

extracting the at least one packet of stream data from the pooled packet; and     transmitting the extracted at least one packet of stream data to a destination associated with the at least one packet via the at least one communications interface.

35. A data communications device comprising:

at least one communications interface;

a memory;

a processor; and an interconnection mechanism coupling the at least one communications interface, the memory and the processor;

wherein the memory is encoded with a packet pool controller application that when performed on the processor, produces a packet pool controller process that causes the data communications device to transmit stream data in a computer network by providing means including:

means for identifying at least two packets of stream data that are destined to a common location in a computer network;

means for forming a pooled packet of stream data using the at least two packets of stream data;

means for generating a pooled packet index for the pooled packet, the pooled packet index indicating a location within the pooled packet of each of the at least two packets; and     means for transmitting the pooled packet to the common location in the computer network, wherein the means for transmitting the pooled packet to the common location in the computer network includes transmitting the pooled packet index to the common location in the computer network.

36. A data communications device comprising:

at least one communications interface;

a memory;

a processor; and an interconnection mechanism coupling the at least one communications interface, the memory and the processor;

wherein the memory is encoded with a packet pool controller application that when performed on the processor, produces a packet pool controller process that causes the data communications device to transmit stream data in a computer network by providing means including:

means for receiving via the at least one communications interface operating as a first destination in the computer network, a pooled packet of stream data containing a representation of at least two packets of stream data and a pooled packet index for the pooled packet, the pooled packet index indicating a location within the pooled packet of each of the at least two packets;

means for detecting if the pooled packet of stream data contains at least one packet of stream data that is to be extracted from the pooled packet of stream data at the first destination, and if the at least one packet of stream data is to be extracted from the pooled packet:

means for extracting the at least one packet of stream data from the pooled packet; and means for transmitting the extracted at least one packet of stream data to a destination associated with the at least one packet.

\* \* \* \* \*